US010253683B2

(12) United States Patent
Musil et al.

(10) Patent No.: US 10,253,683 B2
(45) Date of Patent: Apr. 9, 2019

(54) VARIABLE-NOZZLE TURBINE WITH MEANS FOR RADIAL LOCATING OF VARIABLE-NOZZLE CARTRIDGE

(71) Applicant: Honeywell International Inc., Morris Plains, NJ (US)

(72) Inventors: Jan Musil, Brno (CZ); Nicolas Morand, Vosges (FR); Vit Micanek, Brno (CZ); Jan Klement, Brno (CZ); Francis Abel, La Baffe (FR)

(73) Assignee: Garrett Transportation I Inc., Torrance, CA (US)

( * ) Notice: Subject to any disclaimer, the term of this patent is extended or adjusted under 35 U.S.C. 154(b) by 198 days.

(21) Appl. No.: 15/233,929

(22) Filed: Aug. 10, 2016

(65) Prior Publication Data
US 2018/0045106 A1    Feb. 15, 2018

(51) Int. Cl.
| | | |
|---|---|---|
| F02D 23/00 | (2006.01) | |
| F01D 17/12 | (2006.01) | |
| F02B 37/24 | (2006.01) | |
| F01D 5/04 | (2006.01) | |
| F01D 9/04 | (2006.01) | |
| F01D 25/24 | (2006.01) | |
| F04D 17/10 | (2006.01) | |
| F01D 17/16 | (2006.01) | |

(52) U.S. Cl.
CPC ............ *F02B 37/24* (2013.01); *F01D 5/043* (2013.01); *F01D 9/041* (2013.01); *F01D 17/165* (2013.01);
(Continued)

(58) Field of Classification Search
CPC .......... F02B 37/24; F01D 5/043; F01D 9/041; F01D 17/165; F01D 17/10; F04D 17/10;
(Continued)

(56) References Cited

U.S. PATENT DOCUMENTS 7,559,199 B2     7/2009   Sausse et al.
7,946,116 B2 *   5/2011   Sausse .................. F01D 17/165
                                                                60/602
(Continued)

FOREIGN PATENT DOCUMENTS

EP      2535542 A2    12/2012
WO   2008036862 A2     3/2008

OTHER PUBLICATIONS

EPO Extended Search Report and Opinion in EP Appl. 17181559.0-1610, dated Jan. 5, 2018.

*Primary Examiner* — Thai Ba Trieu
(74) *Attorney, Agent, or Firm* — John C. James (57) ABSTRACT

A turbocharger having a variable-nozzle turbine formed by pivotable vanes supported by a nozzle ring includes an elastically deformable locator disposed between a radially outwardly facing surface of the center housing and an opposing surface of the nozzle ring. In one embodiment the locator is a metallic ring having a radially undulating waveform shape that repeats a plurality of times about a circumference of the locator. In another embodiment the locator is a metallic ring having a C-shaped cross-section in a radial-axial plane. In still another embodiment the locator is a metallic ring having an S-shaped cross-section in a radial-axial plane. In a further embodiment the locator is a plurality of circumferentially spaced, radial locator pins affixed in the center housing and received in radial slots formed in the nozzle ring, the pins restraining the nozzle ring circumferentially and axially but allowing thermal expansion of the nozzle ring.

5 Claims, 8 Drawing Sheets

(52) U.S. Cl.
CPC ............ *F01D 25/24* (2013.01); *F04D 17/10* (2013.01); *F05D 2220/40* (2013.01); *F05D 2240/55* (2013.01); *F05D 2260/30* (2013.01)

(58) Field of Classification Search
CPC ............ F05D 2220/40; F05D 2240/55; F05D 2260/30
USPC .................................... 60/602; 415/159–164
See application file for complete search history.

(56) References Cited

U.S. PATENT DOCUMENTS

| | | | |
|---|---|---|---|
| 7,980,816 B2 * | 7/2011 | Severin | F01D 17/165 415/164 |
| 8,033,109 B2 * | 10/2011 | Sausse | F01D 17/165 415/159 |
| 8,480,358 B2 | 7/2013 | Frank et al. | |
| 8,545,172 B2 | 10/2013 | Severin et al. | |
| 8,684,678 B2 | 4/2014 | Fleig et al. | |
| 8,763,393 B2 * | 7/2014 | Severin | F01D 17/165 415/158 |
| 8,915,704 B2 * | 12/2014 | Severin | F01D 17/165 415/164 |
| 8,967,956 B2 * | 3/2015 | Arnold | F01D 17/16 415/158 |
| 8,985,943 B2 * | 3/2015 | Groves | F01D 17/165 415/162 |
| 2010/0316490 A1 | 12/2010 | Severin et al. | |

* cited by examiner

VARIABLE-NOZZLE TURBINE WITH MEANS FOR RADIAL LOCATING OF VARIABLE-NOZZLE CARTRIDGE

BACKGROUND OF THE INVENTION

The present disclosure relates to turbochargers having a variable-nozzle turbine in which movable vanes are disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The variable vane mechanism is relatively complicated and thus presents a challenge in terms of assembly of the turbocharger. Furthermore, the mechanism is located between the turbine housing, which gets quite hot because of its exposure to exhaust gases, and the center housing, which is at a much lower temperature than the turbine housing. Accordingly, the variable vane mechanism is subject to high temperatures and to thermal stresses because of the noted temperature gradient. All of these factors present a challenge to the radial centering of the variable vane mechanism so that it is substantially concentric with the turbine wheel.

SUMMARY OF THE DISCLOSURE

The present disclosure describes embodiments of turbochargers of the variable-nozzle turbine type noted above, having advantageous locator arrangements for radially locating the nozzle ring relative to the center housing containing the turbocharger bearings. In accordance with a first embodiment, a turbocharger having a variable-nozzle turbine includes:

a turbine comprising a turbine housing and a turbine wheel mounted in the turbine housing and connected to a rotatable shaft for rotation therewith, the turbine housing defining a chamber surrounding the turbine wheel for receiving exhaust gas, and an axially extending bore through which exhaust gas is discharged after passing through the turbine wheel, and a nozzle leading from the chamber generally radially inwardly to the turbine wheel;

a compressor comprising a compressor housing and a compressor wheel mounted in the compressor housing and connected to the rotatable shaft for rotation therewith;

a center housing connected between the compressor housing and the turbine housing and having a nose portion adjacent the turbine wheel defining a generally radially outwardly facing first surface and a second surface that faces generally axially toward the turbine wheel;

a generally annular nozzle ring having a first face comprising one wall of the nozzle and axially spaced from an opposite wall of the nozzle, and an array of vanes circumferentially spaced about the nozzle ring and disposed in the nozzle, the vanes being rotatably mounted to the nozzle ring such that the vanes are variable in setting angle for regulating exhaust gas flow to the turbine wheel, the nozzle ring adjacent an inner diameter thereof defining a generally radially inwardly facing third surface spaced from and opposing the first surface of the center housing; and an elastically deformable locator disposed between the first surface of the center housing and the opposing third surface of the nozzle ring, the locator comprising a metallic ring having a radially undulating waveform shape that repeats a plurality of times about a circumference of the locator. The locator in a relaxed state has an outer diameter that exceeds an inner diameter of the third surface of the nozzle ring, and the locator is installed in a circumferentially preloaded state between the third surface of the nozzle ring and the first surface of the center housing. The locator serves to radially locate the nozzle ring relative to the center housing and has sufficient elastic deformability even at high temperatures to substantially mitigate problems of plastic deformation of the locator.

In accordance with a second embodiment described herein, the elastically deformable locator comprises a metallic ring having a C-shaped cross-section in a radial-axial plane, the C-shaped cross section having two spaced legs each joined to a center web and having an open side opposite from the center web. The ring is oriented with the open side facing in an axial direction of the turbine, and each of the legs defines a plurality of circumferentially spaced U-shaped cutouts that influence the radial stiffness of the locator.

In accordance with a third embodiment described herein, the elastically deformable locator comprises a metallic ring having a Z-shaped or S-shaped cross-section in a radial-axial plane, the S-shaped cross-section having two spaced legs each joined to a center web, the two legs being radially spaced and extending in opposite generally axial directions of the turbine. At least one leg defines a plurality of circumferentially spaced, generally U-shaped cutouts that influence the radial stiffness of the locator.

In accordance with a forth embodiment described herein, the locator comprises a plurality of radially oriented, circumferentially spaced locator pins rigidly affixed in the center housing and received in radial slots formed in a radially inner portion of the nozzle ring. The pins are movable within the slots as limited by side and end walls of the slots. The locator pins constrain the nozzle ring circumferentially and axially but allow a limited degree of relative radial movement resulting from differential thermal expansion between the nozzle ring and the center housing.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
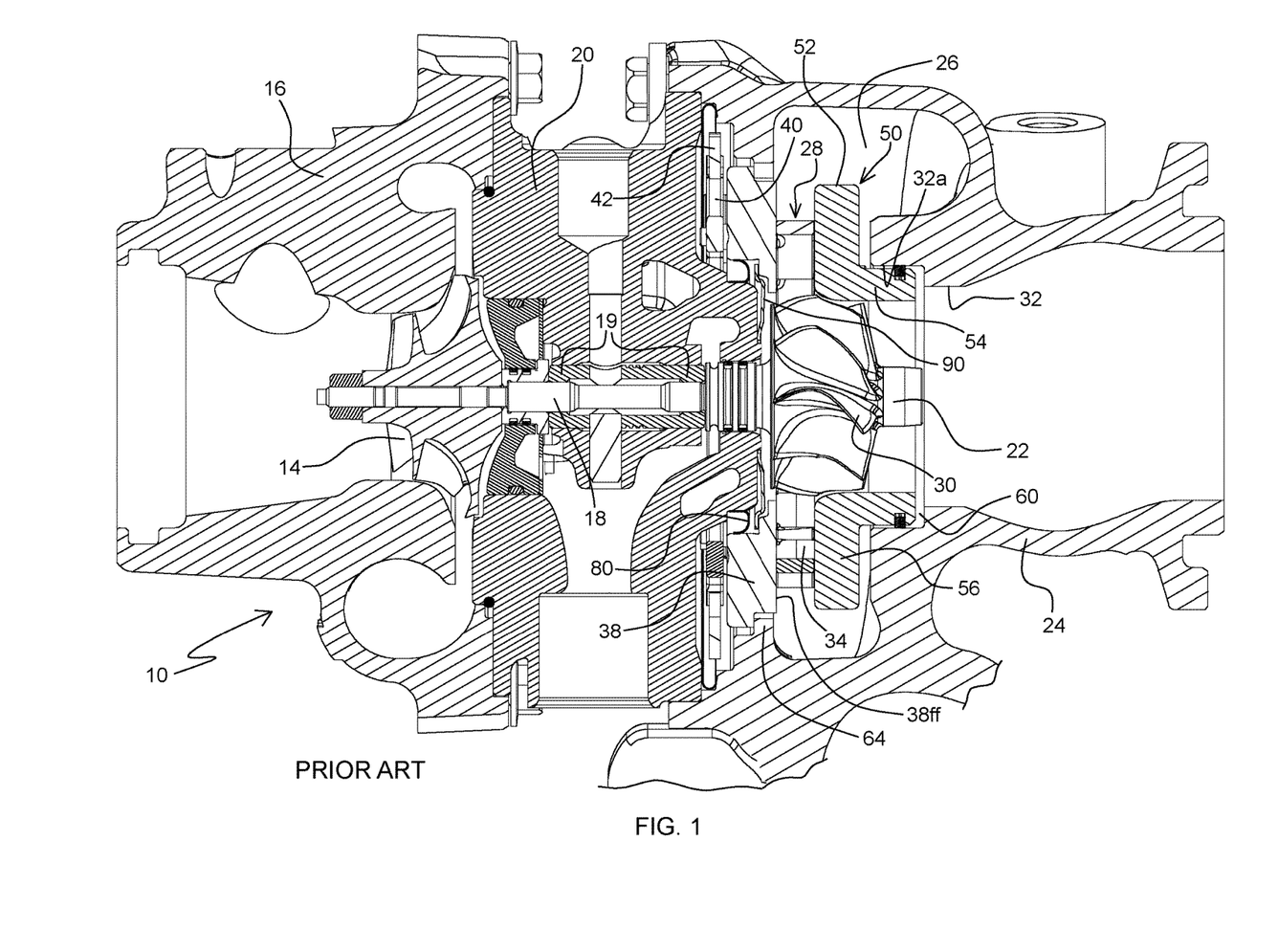
FIG. 1 is an axial cross-sectional view of a turbocharger that does not include the features of the present invention.
Figure 1A:
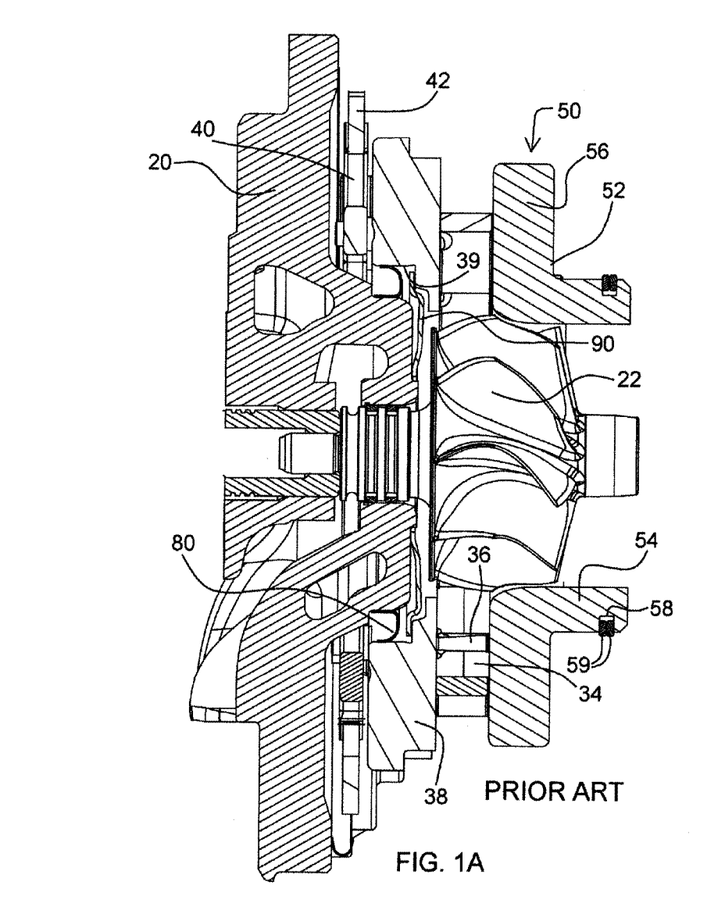
FIG. 1A is a portion of FIG. 1, magnified to illustrate a locator ring between the nozzle ring and the center housing.
Figure 1B:
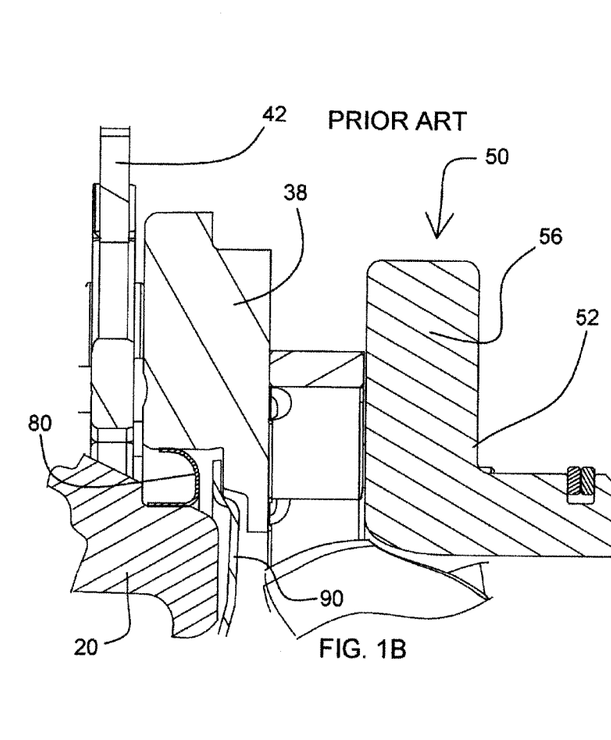
FIG. 1B is a further-magnified portion of FIG. 1A.

The present invention pertains to turbochargers that include a variable-nozzle turbine (VNT), wherein the variable nozzle comprises an array of pivotable vanes mounted on a nozzle ring. FIGS. 1, 1A, and 1B illustrate a VNT turbocharger 10 that is of the general type to which the present invention pertains, but which lacks the features of the invention. The turbocharger includes a compressor wheel or impeller 14 mounted on one end of a rotatable shaft 18 and disposed in a compressor housing 16. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flows through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area and flow direction through the nozzle so as to regulate flow into the turbine wheel. The nozzle includes a plurality of vanes 34 that are circumferentially spaced about the nozzle. Each vane is affixed to a pin 36 that passes through an aperture in a generally annular nozzle ring 38 that is mounted coaxially with respect to the turbine wheel 22. Each pin 36 is rotatable about its axis for rotating the attached vane. A first face 38ff of the nozzle ring 38 forms one wall of the flow passage of the nozzle 28. Each of the pins 36 has a vane arm 40 affixed to an end of the pin that protrudes out from the nozzle ring 38, and is engaged by a generally annular unison ring 42 (also referred to as an actuator ring) that is rotatable about its axis and that is coaxial with the nozzle ring 38. An actuator (not shown) is connected to the unison ring 42 for rotating it about its axis. When the unison ring is rotated, the vane arms 40 are rotated to cause the pins 36 to rotate about their axes, thereby rotating the vanes 34 so as to vary the cross-sectional flow area and flow direction through the nozzle 28.

In the turbocharger 10, the variable vane mechanism is provided in the form of a cartridge 50 that is installable into and removable from the turbocharger as a unit. The cartridge 50 comprises the nozzle ring 38, vanes 34, pins 36, vane arms 40, and unison ring 42. The cartridge further comprises an insert 52 that has a tubular portion 54 sealingly received into a portion 32a of the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. The bore portion 32a of the turbine housing has a radius that exceeds that of the remainder of the bore 32. The radially outer surface of the tubular portion 54 has one or more axially spaced circumferential grooves 58 as shown in FIG. 1, in each of which a sealing ring 59 is retained for sealingly engaging the inner surface of the bore portion 32a. Advantageously, the outer diameter of the tubular portion 54 of the insert is slightly less than the inner diameter of the bore portion 32a so that a slight gap is defined therebetween, and hence the inner surface of the bore portion 32a is contacted only the sealing ring(s). Additionally, there is a gap 60 between the nozzle portion 56 and the adjacent end of the turbine housing at the end of the bore portion 32a. In this manner, the insert 52 is mechanically and thermally decoupled from the turbine housing 24.

A plurality of spacers are connected between the nozzle ring 38 and the nozzle portion 56 of the insert 52 for securing the nozzle ring to the insert and maintaining the desired axial spacing between the nozzle ring 38 and the nozzle portion 56. Advantageously, the spacers are formed of a material having good high-temperature mechanical properties and a relatively low thermal conductivity, such as stainless steel (e.g., grade 310 stainless steel) or the like, so that the nozzle ring 38 and insert 52 are effectively thermally decoupled from each other.

The variable-vane cartridge 50 also comprises a generally annular support ring 64 (which in the illustrated embodiment is integral with the turbine housing 24, but alternatively can be a separate part whose radially outer periphery is captured between the turbine housing 24 and the center housing 20 when these housings are bolted together). A radially inner periphery of the support ring 64 engages a surface of the nozzle ring 38 that faces toward the insert 52. The engagement between the support ring 64 and the nozzle ring 38 preferably is along a full 360-degree circumference of the nozzle ring so as to substantially seal the interface between the support ring and the nozzle ring. The support ring 64 also assists the spacers in restraining the nozzle ring with respect to axial movement in the direction toward the insert 52. Advantageously, the support ring 64 has a radially inner surface facing toward a radially outer surface of the nozzle ring 38, and the support ring surface is slightly greater in diameter than the nozzle ring surface such that there is a radial gap between these surfaces. This gap accommodates radial displacement of the nozzle ring surface relative to the opposing support ring surface, such as may occur through differential thermal growth or other causes.

The cartridge 50 further comprises a locator ring 80 that is captively retained between the nozzle ring 38 and the center housing 20 when the cartridge is installed onto the center housing. The locator ring 80 has a C-shaped cross-section and has a radially inner surface that engages a radially outwardly facing surface of the center housing 20 so as to establish substantial concentricity between the center housing and locator ring. The radially outer surface of the locator ring 80 engages a radially inwardly facing locating surface 39 (FIG. 1A) of the nozzle ring 38 so as to radially locate the nozzle ring substantially concentric with the locator ring, and therefore with the center housing. In this manner, the concentricity of the nozzle ring 38 with respect to the center housing (and therefore with respect to the turbine wheel 22) is established. Thus, as long as the insert 52 is substantially concentric with the nozzle ring 38, then the turbine flow path contour defined by the insert 52 will be substantially concentric with the turbine wheel, independent of the turbine housing 24.

The turbocharger 10 further includes a shroud spring 90 formed of a high-temperature-resistant sheet metal. The shroud spring at its radially inner side contacts an axially facing surface of the center housing that faces the turbine wheel 22, and at its radially outer side the shroud spring contacts an axially facing surface of the nozzle ring 38 facing toward the center housing. The shroud spring is axially compressed between the center housing and the nozzle ring and serves to exert an axial force on the nozzle ring 38 toward the insert 52 (to the right in FIGS. 1, and 1A, and 1B). The shroud spring also serves as a heat shield between the turbine and the center housing.

The turbocharger 10 having the variable-nozzle cartridge 50 located by the C-shaped locator ring 80 in accordance with the prior art has proven to be an advantageous construction, but further improvements are sought. In particular, improvements are sought with respect to the locator for the nozzle ring 38. One drawback of the C-shaped locator ring 80 is that it can tend to undergo substantial plastic deformation under the preload force exerted on it between the center housing and the nozzle ring, exacerbated by the high-temperature exhaust gases to which it is exposed. Reduction or elimination of plastic deformation of the locator ring is sought, along with other advantages afforded by the present invention.

Figure 2:
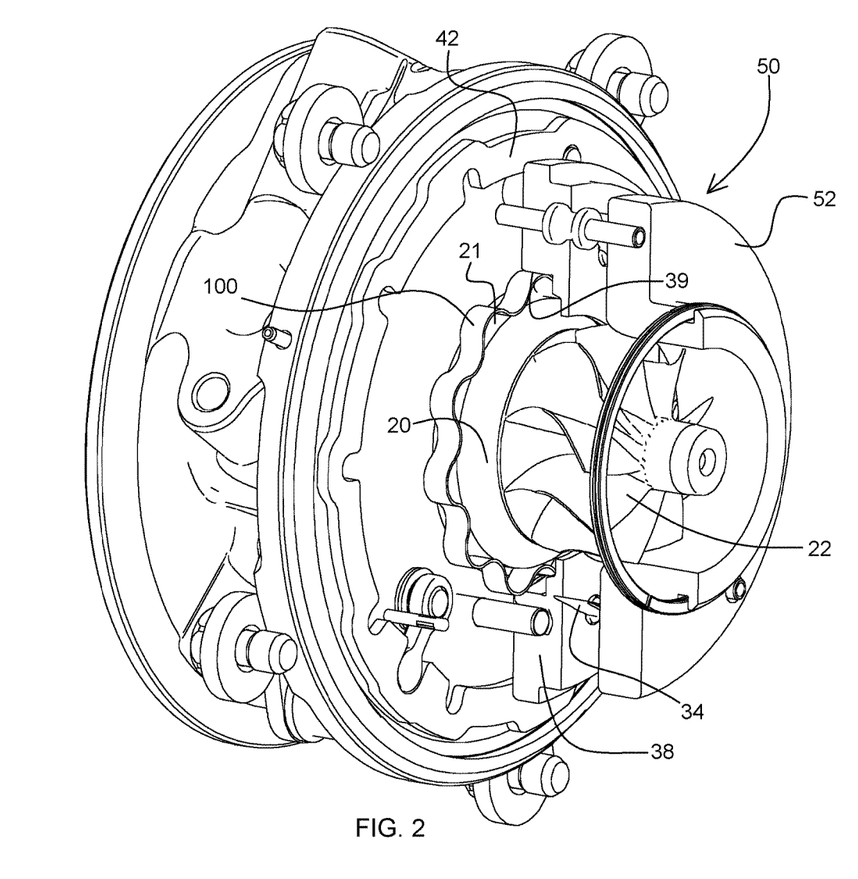
FIG. 2 is a perspective view of a partial assembly for a turbocharger in accordance with a first embodiment of the invention.

In this regard, a first embodiment of the present invention is depicted in FIG. 2. The partial assembly for a turbocharger shown in FIG. 2 is substantially similar to the corresponding assembly of the prior-art turbocharger described previously, having a center housing 20 assembled with a variable-nozzle cartridge 50. The cartridge includes an insert 52 connected by spacers 62 to a nozzle ring 38 that supports a plurality of pivotable vanes 34 actuated by a rotary unison ring 42 in the manner previously described. In this embodiment the nozzle ring 38 is located relative to the center housing 20 by an elastically deformable locator 100. The locator 100 comprises a metallic ring having a radially undulating waveform shape that repeats a plurality of times about a circumference of the locator. The locator in a relaxed state has an outer diameter that exceeds an inner diameter of the locating surface 39 of the nozzle ring. The locator is installed in a circumferentially preloaded state between the locating surface 39 of the nozzle ring and an opposing first surface 21 of the center housing, and serves to radially locate the nozzle ring relative to the center housing. In one embodiment the locator comprises a metallic strip having two opposite ends and formed into a ring with a gap between the two opposite ends, i.e., a split ring. The radial waves of the locator ring 100 define the radial stiffness of the ring under the radial preload exerted on it between the nozzle ring and the center housing.

Figure 3:
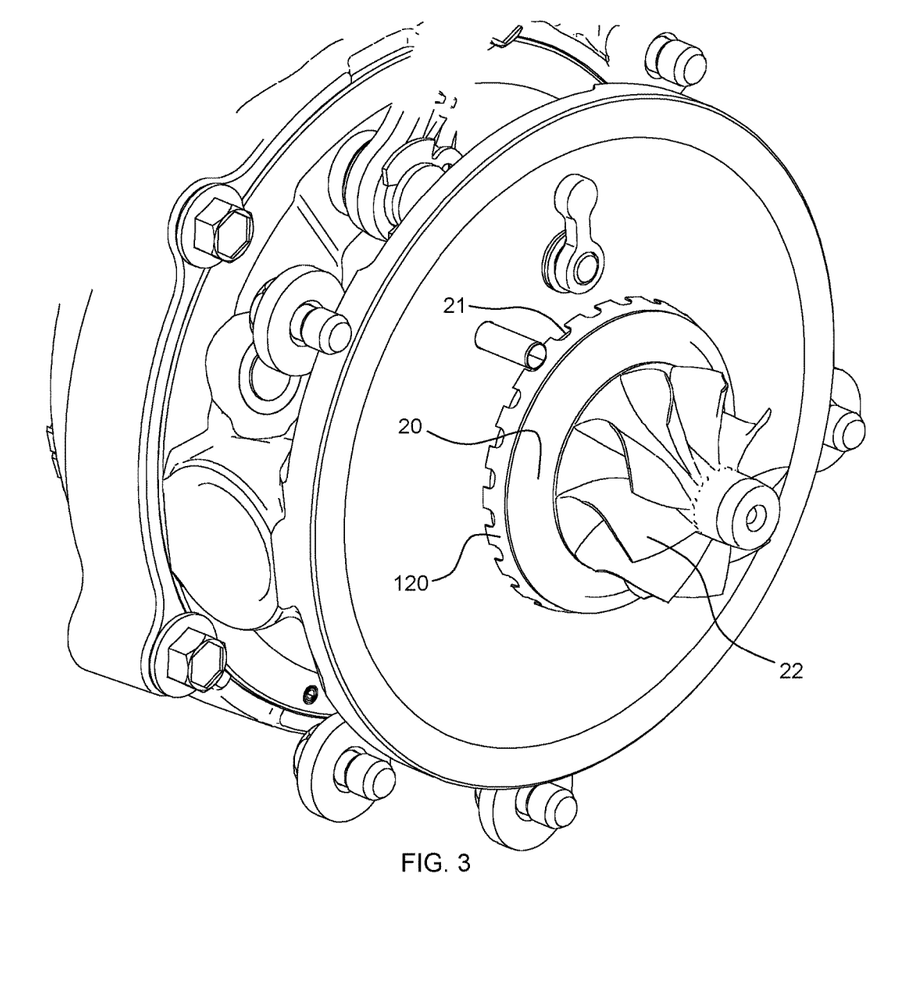
FIG. 3 is a perspective view of a partial assembly for a turbocharger in accordance with a second embodiment of the invention.
Figure 3A:
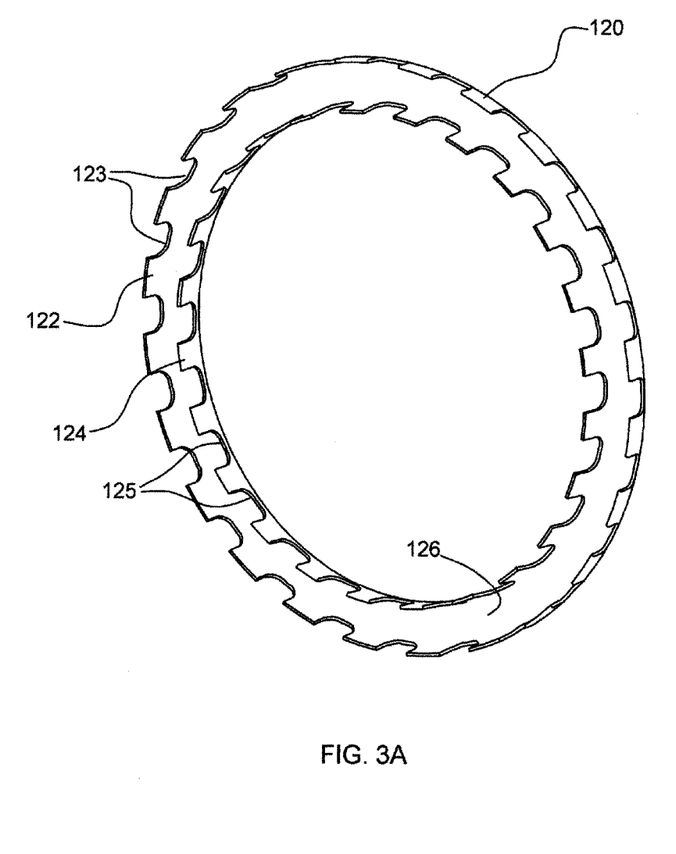
FIG. 3A is a perspective view of an elastically deformable locator for use in the second embodiment of the invention.

A second embodiment of the invention is depicted in FIGS. 3 and 3A. The elastically deformable locator in the second embodiment comprises a metallic ring 120 having a C-shaped cross-section in a radial-axial plane. The C-shaped cross section has two spaced legs 122 and 124 each joined to a center web 126 and having an open side opposite from the center web. The locator is oriented with the open side facing in an axial direction away from the turbine as shown in FIG. 3. The leg 122 contacts a radially inner locating surface 39 (see FIG. 2) of the nozzle ring and the other leg 124 contacts a radially outwardly facing first surface 21 of the center housing 20 so as to radially located the nozzle ring with respect to the center housing. The leg 122 defines a plurality of circumferentially spaced U-shaped cutouts 123 and the other leg 124 similarly defines a plurality of circumferentially spaced U-shaped cutouts 125. The cutouts 123, 125 influence the radial stiffness of the locator. Additionally, the U-shaped cutouts allow exhaust gas pressure communication from one side of the locator ring 120 to the other side, i.e., from the side proximate the unison ring 42 to the side proximate the shroud spring 90 (see FIGS. 1A and 1B for comparison) so as to equalize the pressures on the opposite sides.

Absent the cutouts as in the prior-art design of FIGS. 1A and 1B, the locator ring 80 acts as a seal between these two areas, and therefore the relatively higher pressure that exists in the cavity where the unison ring 42 resides is not communicated to the other side (the right side in FIGS. 1A and 1B) of the locator ring 80. This results in a pressure differential across the shroud spring 90 because the pressure on the turbine wheel side of the shroud spring is relatively high. This pressure differential acts opposite to the spring force of the shroud spring and therefore reduces the biasing force exerted on the nozzle ring 38 toward the insert 52.

However, in accordance with the second embodiment of the invention of FIGS. 3 and 3A, the locator ring 120 allows pressure communication across it, so the higher pressure in the cavity where the unison ring resides is exerted on the shroud spring so as to urge it axially against the nozzle ring 38, thereby increasing the preload force between the shroud spring and the nozzle ring. This leads to better fixation of the VNT cartridge 50.

Figure 4:
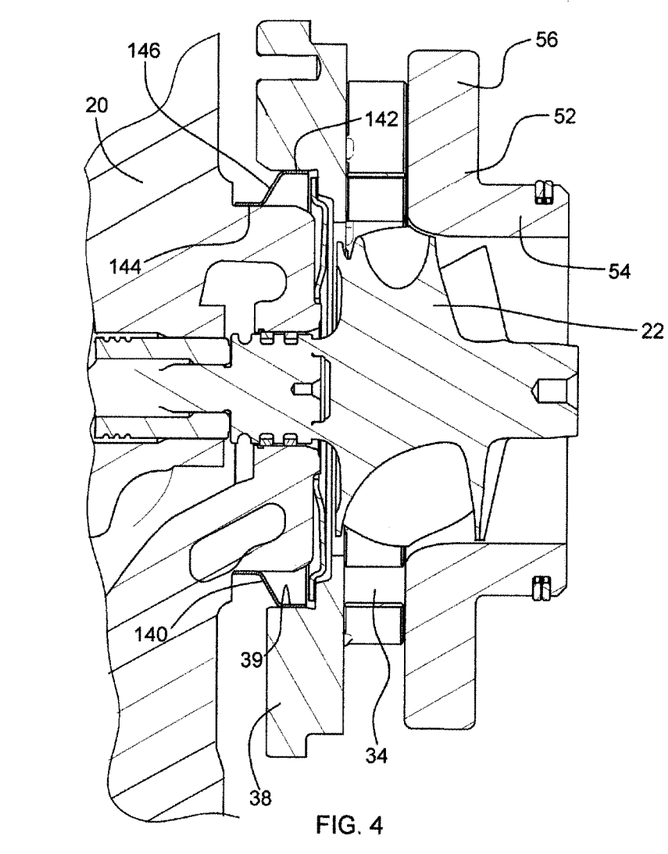
FIG. 4 is fragmentary axial cross-sectional view of a turbocharger in accordance with a third embodiment of the invention.

A third embodiment of the invention is shown in FIG. 4. The elastically deformable locator in the third embodiment comprises a metallic ring 140 having an S-shaped or Z-shaped cross-section in a radial-axial plane. The S-shaped cross-section has two spaced legs 142 and 144 each joined to a center web 146, the two legs being radially spaced and extending in opposite generally axial directions of the turbine. The leg 142 contacts a radially inwardly facing surface 39 of the nozzle ring 38 and the other leg 144 contacts a radially outwardly facing surface of the center housing 20 so as to radially located the nozzle ring with respect to the center housing. One or each of the legs 142, 144 can include circumferentially spaced U-shaped cutouts as in the prior embodiment so as to enable the pressure communication across the locator ring as previously described. The locator 140 with the S-shaped cross-section is expected to have lower stress than the prior-art locator 80 with the C-shaped cross-section for the same radial preload. Thus, the preload force can be the same for both designs, but the risk of plastic deformation of the locator is lower for the S-shaped cross-section design.

Figure 5A:
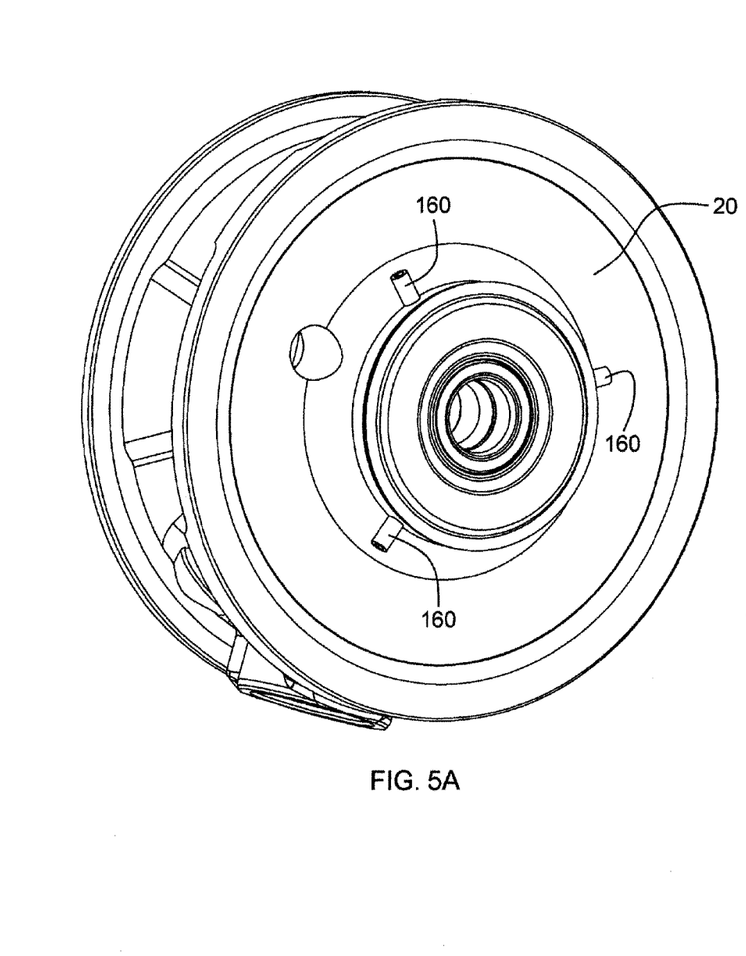
FIG. 5A is a perspective view of a partial assembly of a turbocharger, including the center housing having locator pins in accordance with a fourth embodiment of the invention.
Figure 5B:
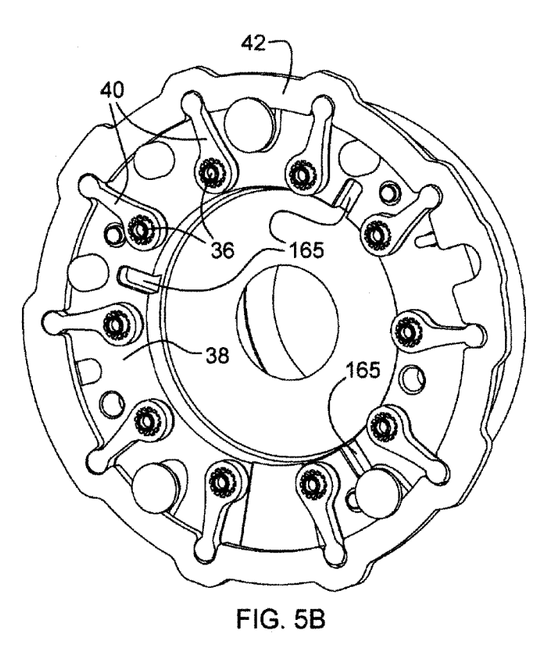
FIG. 5B is a perspective view of a further partial assembly of the turbocharger, including the nozzle ring having slots for receiving the locator pins in accordance with the fourth embodiment.
Figure 5C:
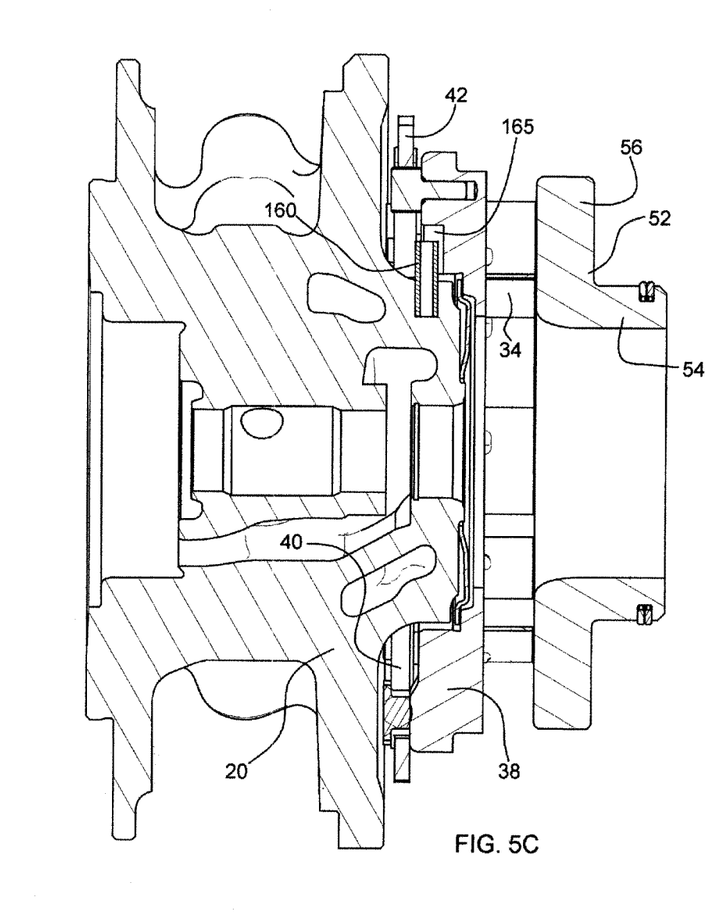
FIG. 5C is a fragmentary axial cross-sectional view of a turbocharger in accordance with the fourth embodiment of the invention.

A fourth embodiment of the invention is illustrated in FIGS. 5A-5C. FIG. 5A shows a center housing 20 in which a plurality (three, in this particular illustrated embodiment, although the number could be different from three) of radially oriented, circumferentially spaced locator pins 160 are rigidly affixed. The locator pins are received in radial slots 165 (FIGS. 5B and 5C) formed in the radially inner portion of the nozzle ring 39. The pins are movable within the slots as limited by side and end walls of the slots. The locator pins constrain the nozzle ring circumferentially and axially but allow relative radial movement resulting from differential thermal expansion between the nozzle ring and the center housing. The locator pin design is not susceptible to plastic deformation in the way that the locator ring 80 tends to be.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger having a variable-nozzle turbine, comprising:
   a turbine comprising a turbine housing and a turbine wheel mounted in the turbine housing and connected to a rotatable shaft for rotation therewith;
      wherein the turbine housing defines a chamber surrounding the turbine wheel for receiving exhaust gas, and an axially extending bore through which the exhaust gas is discharged after passing through the turbine wheel;
   a nozzle leading from the chamber generally radially inwardly to the turbine wheel;
   a compressor comprising a compressor housing and a compressor wheel mounted in the compressor housing and connected to the rotatable shaft for rotation therewith;
   a center housing connected between the compressor housing and the turbine housing;
   an annular nozzle ring having a first face;
      wherein the first face comprises one wall of the nozzle, the first face axially spaced from an opposite wall of the nozzle;
   an array of vanes circumferentially spaced about the nozzle ring and disposed in the nozzle;
      wherein the vanes are rotatably mounted to the nozzle ring such that the vanes are variable in setting angle for regulating the exhaust gas flow to the turbine wheel; and
   a locator disposed between the center housing and a radially inner portion of the nozzle ring;
      wherein the locator comprises a plurality of radially oriented, circumferentially spaced locator pins rigidly affixed in the center housing and receiving in radial slots formed in the radially inner portion of the nozzle ring;
         wherein the plurality of the radially oriented, circumferentially spaced locator pins are movable within the radial slots as limited by side and end walls of the radial slots; and
         wherein the plurality of the radially oriented, circumferentially spaced locator pins constrains the nozzle ring circumferentially and axially, while allowing relative radial movement resulting from differential thermal expansion between the nozzle ring and the center housing.

2. A turbocharger having a variable-nozzle turbine, comprising:
   a turbine comprising a turbine housing and a turbine wheel mounted in the turbine housing and connected to a rotatable shaft for rotation therewith;
      wherein the turbine housing defines a chamber surrounding the turbine wheel for receiving exhaust gas, and an axially extending bore through which the exhaust gas is discharged after passing through the turbine wheel;
   a nozzle leading from the chamber generally radially inwardly to the turbine wheel;
   a compressor comprising a compressor housing and a compressor wheel mounted in the compressor housing and connected to the rotatable shaft for rotation therewith;
   a center housing connected between the compressor housing and the turbine housing and defining a radially outwardly facing first surface;
   an annular nozzle ring having a first face;
      wherein the first face comprises one wall of the nozzle, the first face being axially spaced from an opposite wall of the nozzle; and
   an array of vanes circumferentially spaced about the nozzle ring and disposed in the nozzle;
      wherein the vanes are rotatably mounted to the nozzle ring such that the vanes are variable in setting angle for regulating the exhaust gas flow to the turbine wheel; and
      wherein the nozzle ring includes an inner diameter defining a radially inwardly facing locating surface spaced from and opposing the radially outwardly facing first surface of the center housing; and an elastically deformable locator disposed between the radially outwardly facing first surface of the center housing and the radially inwardly facing locating surface of the nozzle ring;
   wherein the elastically deformable locator comprises a metallic ring having a radially undulating waveform shape that repeats a plurality of times about a circumference of the elastically deformable locator;
   wherein the elastically deformable locator in a relaxed state includes an outer diameter that exceeds an inner diameter of the locating surface of the nozzle ring;
   wherein the elastically deformable locator is installed in a circumferentially preloaded state between the locating surface of the nozzle ring and the radially outwardly facing first surface of the center housing; and
   wherein the elastically deformable locator serves to radially locate the nozzle ring relative to the center housing.

3. The turbocharger of claim 2, wherein the elastically deformable locator comprises a metallic strip having two opposite ends and formed into a ring with a gap between the two opposite ends.

4. A turbocharger having a variable-nozzle turbine, comprising:
   a turbine comprising a turbine housing and a turbine wheel mounted in the turbine housing and connected to a rotatable shaft for rotation therewith;
      wherein the turbine housing defines a chamber surrounding the turbine wheel for receiving exhaust gas, and an axially extending bore through which the exhaust gas is discharged after passing through the turbine wheel;
   a nozzle leading from the chamber generally radially inwardly to the turbine wheel;
   a compressor comprising a compressor housing and a compressor wheel mounted in the compressor housing and connected to the rotatable shaft for rotation therewith;
   a center housing connected between the compressor housing and the turbine housing and defining a radially outwardly facing first surface;
   an annular nozzle ring having a first face;
      wherein the first face comprises one wall of the nozzle, the first face being axially spaced from an opposite wall of the nozzle;
   an array of vanes circumferentially spaced about the nozzle ring and disposed in the nozzle;
      wherein the vanes are rotatably mounted to the nozzle ring such that the vanes are variable in setting angle for regulating the exhaust gas flow to the turbine wheel;
      wherein the nozzle ring includes an inner diameter defining a radially inwardly facing locating surface spaced from and opposing the radially outwardly facing first surface of the center housing; and
   an elastically deformable locator disposed between the radially outwardly facing first surface of the center housing and the radially inwardly facing locating surface of the nozzle ring;
      wherein the elastically deformable locator comprises a metallic ring having a C-shaped cross-section in a radial-axial plane;
         wherein the C-shaped cross section includes two spaced legs each joined to a center web and an open side opposite from the center web; and
         wherein each of the legs defines a plurality of circumferentially spaced U-shaped cutouts that influence the radial stiffness of the elastically deformable locator.

5. A turbocharger having a variable-nozzle turbine, comprising:
   a turbine comprising a turbine housing and a turbine wheel mounted in the turbine housing and connected to a rotatable shaft for rotation therewith;
      wherein the turbine housing defines a chamber surrounding the turbine wheel for receiving exhaust gas, and an axially extending bore through which the exhaust gas is discharged after passing through the turbine wheel;
   a nozzle leading from the chamber generally radially inwardly to the turbine wheel;
   a compressor comprising a compressor housing and a compressor wheel mounted in the compressor housing and connected to the rotatable shaft for rotation therewith;
   a center housing connected between the compressor housing and the turbine housing and defining a radially outwardly facing first surface;
   an annular nozzle ring having a first face;
      wherein the first face comprises one wall of the nozzle, the first face axially spaced from an opposite wall of the nozzle;
   an array of vanes circumferentially spaced about the nozzle ring and disposed in the nozzle;
      wherein the vanes are rotatably mounted to the nozzle ring such that the vanes are variable in setting angle for regulating exhaust gas flow to the turbine wheel; and
      wherein the nozzle ring includes an inner diameter defining a radially inwardly facing locating surface spaced from and opposing the radially outwardly facing first surface of the center housing; and
   an elastically deformable locator disposed between the radially outwardly facing first surface of the center housing and the radially inwardly facing locating surface of the nozzle ring;
      wherein the elastically deformable locator comprises a metallic ring having an S-shaped cross-section in a radial-axial plane;
         wherein the S-shaped cross-section includes two spaced legs each joined to a center web;
         wherein the two legs are radially spaced and extending in opposite generally axial directions of the turbine; and
         wherein at least one leg of the S-shaped cross-section defines a plurality of circumferentially spaced U-shaped cutouts that influence the radial stiffness of the elastically deformable locator.

\* \* \* \* \*